UNITED STATES PATENT OFFICE.

CHARLES H. BREERWOOD, OF PHILADELPHIA, PENNSYLVANIA.

REFRACTORY MATERIAL AND PROCESS OF MAKING THE SAME.

1,380,700.  Specification of Letters Patent.  Patented June 7, 1921.

No Drawing.  Application filed March 11, 1918. Serial No. 221,656.

*To all whom it may concern:*

Be it known that I, CHARLES H. BREERWOOD, a citizen of the United States, and a resident of Philadelphia, in the county of Philadelphia and State of Pennsylvania, have invented a new and useful Improvement in Refractory Materials and Processes of Making the Same, of which the following is a specification.

My invention relates to processes for making refractory substances adapted for use in making refractory linings for, or walls of, furnaces, crucibles and the like, and for making such refractory linings, and also to the product resulting from such processes. Heretofore and until quite recently, ferromagnesite has been generally used for making magnesite bricks for the walls of open-hearth and similar furnaces, and also for lining the bottom of such furnaces. Until recently it has generally been obtained from Austria. This material, however, is now, and for some time past has been either unobtainable in sufficient quantities for the purpose, or only at so high a cost as to be almost prohibitive. Ordinary commercial dolomite has also been used to some extent for lining the bottom of such furnaces, although its use for this purpose has been heretofore unsatisfactory. It is well known that lime is a more refractory substance than magnesite, besides being very much cheaper. For these reasons substances containing a large amount of lime, such as ordinary commercial dolomite, would seem to be much better fitted for refractory linings for furnaces, crucibles and the like, than magnesite itself. But wherever it has been attempted to use lime or lime substances, such as dolomite, for the purpose, and especially with open-hearth and similar furnaces, it has been found that the presence of free lime in the lining, or in the refractory substances from which it is to be made, causes absorption of moisture from the atmosphere, swelling and cracking, causing the lining to disintegrate and go to pieces. For these reasons such substances have been wholly useless for making bricks for furnaces. Dolomite has to some extent been used to spread over the bottom of open-hearth or similar furnaces to form a refractory bottom lining, but its use for this purpose has been unsatisfactory owing to the presence of free lime, as above described, and also owing to the more or less porous and friable character of the substance. As a result, the furnace charge easily penetrates the substance, the silicon of the furnace charge combining or fluxing with the free lime, the furnace charge often escapes to a greater or less extent through the bottom lining, and so much of the dolomite substance is swept out with the furnace charge when it is discharged, that a new supply has to be furnished after almost every charging of the furnace.

In the preparation of ferro-magnesite and dolomite as heretofore prepared for use as above described, the said substances have been burned, or re-burned, at a relatively low heat, and in a relatively coarse condition, and with the constituents not thoroughly mixed.

I have discovered that lime, or substances containing a substantial amount of lime, such as ordinary commercial dolomite, may be successfully used for making refractory linings for furnaces, crucibles and the like, by mixing them with a small proportion of some material adapted under heat to sinter with free lime, such as iron for example, grinding the mixture together until their constituents are thoroughly intermingled or mixed in a fine state of sub-division, and subjecting them to intense heat sufficient to sinter the free lime and the iron or other fluxing material mixed with the lime. The iron, or other fluxing material, used, and the free lime, are by the fine grinding and mixing brought so intimately together that when subjected to the intense heat practically every particle of the free lime becomes sintered with the iron or other fluxing material. Accordingly in the finished refractory substances, or in the refractory lining made therefrom, there is practically no free lime, and accordingly all the objections heretofore encountered in practice in the attempted use of lime substances for refractory linings, are met or removed.

My invention consists in the novel process and product herein described and claimed.

Referring now more in detail to my improved process in its preferred form, I take lime in any suitable form, such, for example, as ordinary commercial dolomite, and mix with it a small amount of iron. Ordinary dolomite usually contains a small amount of iron itself, ranging usually from one-half per cent, to one and one-half per cent. I add enough iron to bring this up preferably to six to twelve per cent., although this percentage may be varied somewhat under varying conditions. I grind the dolomite and iron preferably exceedingly fine, say ninety-five per cent. through a sieve containing ten thousand holes per square inch, or eighty-five per cent. through a sieve containing forty thousand holes per square inch. By this grinding the various constituents of the dolomite and iron are thoroughly mixed in a very fine comminuted condition, and the fine particles of free lime and iron are closely and intimately associated with each other. I then pass this ground and thoroughly mixed mass through a furnace, subjecting it to a very high or intense heat, and for a long enough period so that the elements composing the mixture are thoroughly vitrified or amalgamated and emerge from the furnace in a hard, dense, vitrified condition. In this condition the iron and the particles of the free lime have become amalgamated or sintered together so that there is now practically no free lime left in the mass. I employ any ordinary kiln or furnace used for burning such material, employing, however a very intense heat. In order to insure the complete vitrification or amalgamation of the constituents of the dolomite in the burning process, and the sintering of the iron and the free lime, I preferably cause the finely ground and mixed mass to be formed into balls, which operation I cause to take place as soon as possible after the introduction of the material into the furnace, so that the material, or most of it, passes through the furnace in the form of balls. I have found that in this way more complete vitrification, amalgamation and sintering take place than if the material lies in the form of powder in the furnace during the greater part of its passage through the furnace. I preferably employ special means for causing such balling operation to take place and as near the feed end of the kiln as possible, by mixing with the finely ground and mixed dolomite small pieces of material to which the ground dolomite is adapted to adhere in its passage through the furnace, the said pieces rolling up into larger and larger balls as it proceeds through the furnace. Any suitable pieces of material may be used for the purpose, such as small pieces of coal tar or iron or fire brick or clinker dolomite, soaked in water, oil or other suitable material. These form centers on which the ground dolomite material collects and rolls up like a snow ball. These balls vary greatly in diameter. I have found that the heat of the furnace is applied more readily to the dolomite when in the form of balls, than when it lies in the bottom of the furnace in the shape of powder, and vitrification or amalgamation or sintering of its constituents takes place much more readily.

I find that sometimes it is necessary to regrind the material that has been thus vitrified or amalgamated, as some of the balls form and come down in the kiln so quickly that the interior of such balls are not thoroughly burned and vitrified. Such balls when passed through the furnace but once, practically go to powder on exposure to the air, which is not the case when the balls have been thoroughly vitrified or amalgamated throughout. Where such re-grinding is necessary I treat the re-ground material in precisely the same way as the original dolomite, re-grinding and mixing it and subjecting it to heat in the furnace, and balling it in the manner already described.

In practice I have found iron a satisfactory material to sinter with the free lime, but other fluxing materials than iron adapted to sinter with the free lime when ground fine and intimately mixed with it and subjected to intense heat, may be used in its place, such as aluminum or chromium. The amount of iron or other fluxing material used will vary, of course, with the particular lime substance used, the amount of iron it contains normally, and varying conditions of use. All that is essential is to use sufficient of the fluxing material, whether iron or other fluxing substance, to cause the sintering of practically all the free lime. Any material other than iron may be used for the purpose that is capable of causing such sintering with free lime.

In practice I prefer to use ordinary commercial dolomite, as it contains a substantial amount of lime, is readily procurable, and is cheap. Any other substance containing substantial quantities of lime, however, may be used, if desired, in its place.

In order further to guard against combination of the silicon in the furnace charge with lime in the bottom lining or brick walls made from my improved refractory material, I also preferably add to the dolomite or other lime substance before it is ground, a neutral substance such as chrome ore, which helps to neutralize or prevent the combination of the silicon in the furnace charge with any lime in the refractory lining or bricks, tending to make such lining or bricks still more refractory and durable. In practice I add to the mass of the dolomite about five or ten per cent. of chrome ore before the dolomite is ground, and grind the mixture and treat it as above set forth. Other neutral substances, such as graphite, for example, may be used in place of chrome ore.

In the prior treatment of dolomite and ferro-magnesite preparatory to their use as linings in furnaces, occasionally balls are formed in the passage through the furnace, but they occur rarely, and are more or less accidental, and are only formed toward the end of the passage of such material through the furnace and at too late a time to be of any value. By my improved process in its preferred form such balling is deliberately caused and at an early stage of the burning process, so that the material, or a very large part of it, passes throughout the greater part of the furnace in the form of balls, in which form the heat of the furnace is applied to much greater advantage, and for a long enough period of time thoroughly to vitrify or amalgamate the constituents of the material.

In practice I prefer to use intense enough heat in the first treatment of my mixture of iron and dolomite, or other lime substance, to vitrify the mass and sinter the iron and free lime, for then the refractory substance is completely ready for use to make a refractory lining for a furnace or crucible or the like, but under some circumstances it would be sufficient in the heating of the mass in a furnace to merely use sufficient heat to cause the mass to clinker without effecting complete vitrification or sintering, and later apply the intense heat for accomplishing such vitrification and sintering either in a furnace for heating the mass again, or by accomplishing such vitrification and sintering by spreading the refractory substance in the bottom of a furnace, such as an open-hearth furnace, for example, and causing the heat of the furnace charge itself to vitrify and sinter the refractory substance.

Of course it will be understood that in making refractory linings of furnaces, crucibles and the like, out of my improved refractory substance, the balls or clinkers thereof must be ground or broken up.

The term "sintering," used by me in the specification and claims herein as produced between the iron or other fusing material and the free lime of the dolomite or other lime substance used, is employed by me in the sense of denoting the union that takes place between these two substances, whether chemical or mechanical, which combines them so as to eliminate free lime or lime that would hydrate, or combine readily with silica.

It will be understood, of course, that the proportions of the ingredients used, the fineness of the grinding, and the heat and length of time employed in the sintering operation, may be varied within reasonable bounds without departing from my invention.

What I claim as new and desire to secure by Letters Patent, is:

1. The process of making refractory substances adapted for use in making refractory linings or walls of furnaces, crucibles and the like, which consists in introducing material adapted to form a sinter in a finely divided state into a furnace, mixing with it small pieces of material to which the finely divided substance is adapted to adhere in its passage through the furnace to form balls, and subjecting it in such form to such heat and for such a length of time, as to make the substance refractory.

2. The process of making refractory substances adapted for use in making refractory linings or walls of open-hearth or similar furnaces, which consists in mixing with a lime substance a material adapted under heat to sinter with the free lime of the lime substance, grinding the two together until their constitutents are thoroughly intermingled in a fine state of division, mixing with it small pieces of material to which the finely divided substance is adapted to adhere in its passage through the furnace, introducing such a mixture into a furnace, passing it through the furnace and subjecting it to intense heat therein during its passage therethrough, whereby the mixture will early in its passage through the furnace be formed into balls and be subjected to the intense heat while in such form during the greater part of its passage through the furnace to vitrify or fuse or amalgamate the mixture.

3. The process of making refractory substances adapted for use in making refractory linings or walls of furnaces, crucibles and the like, which consists in introducing ordinary commercial dolomite or its equivalent, and a small amount of iron, in a finely divided state into a furnace, mixing with it small pieces of dolomite clinker saturated with water, oil or other substance, adapted to cause the finely divided material to adhere to the clinker in its passage through the furnace to form balls, and subjecting it in such form to such heat and for such a length of time, as to vitrify or amalgamate the substance, and fuse the iron with the free lime of the dolomite.

4. The process of making refractory substance adapted for use in making refractory linings or walls of furnaces, crucibles and the like, which consists in mixing with a lime substance a material adapted under heat to sinter with the free lime of the lime substance, grinding the two together until their constituents are thoroughly intermingled in a fine state of division, subjecting it to intense heat in a furnace, regrinding the resultant mass and again subjecting it to intense heat in a furnace to thoroughly vitrify and amalgamate the mass and sinter its free lime.

In testimony whereof, I have signed my name to this specification.

CHARLES H. BREERWOOD.